United States Patent
Kang et al.

(10) Patent No.: US 11,228,467 B1
(45) Date of Patent: Jan. 18, 2022

(54) METHOD FOR COMPENSATING LOSS OF HIGH-SPEED SIGNALS IN A COMMUNICATION CHANNEL, AND A DEVICE FOR SAID METHOD

(71) Applicant: VSI CORPORATION, Seoul (KR)

(72) Inventors: Suwon Kang, Guri-si (KR); Sungmin Han, Seoul (KR)

(73) Assignee: VSI CORPORATION, Seoul (KR)

(*) Notice: Subject to any disclaimer, the term of this patent is extended or adjusted under 35 U.S.C. 154(b) by 0 days.

(21) Appl. No.: 17/106,352

(22) Filed: Nov. 30, 2020

(30) Foreign Application Priority Data

Oct. 6, 2020 (KR) .................. 10-2020-0128458

(51) Int. Cl.
*H04L 27/01* (2006.01)
*H04L 25/03* (2006.01)
*H04L 27/26* (2006.01)

(52) U.S. Cl.
CPC .. *H04L 25/03031* (2013.01); *H04L 25/03885* (2013.01); *H04L 27/2613* (2013.01)

(58) Field of Classification Search
CPC combination set(s) only.
See application file for complete search history.

(56) References Cited

U.S. PATENT DOCUMENTS

| 10,608,848 B1* | 3/2020 | Azenkot ........... H04L 25/03057 |
| 10,742,458 B2* | 8/2020 | Fujii ................. H04L 25/03885 |
| 2003/0028570 A1* | 2/2003 | Albert .................. H03G 3/3068 708/323 |
| 2013/0148712 A1 | 6/2013 | Malipatil et al. |
| 2017/0244371 A1* | 8/2017 | Turker Melek ....... H03F 1/0205 |
| 2018/0287837 A1* | 10/2018 | Zhang .................. H03M 1/182 |

FOREIGN PATENT DOCUMENTS

| JP | 2006-164487 A | 6/2006 |
| KR | 10-2001-0109967 A | 12/2001 |
| KR | 10-2018-0012808 A | 2/2018 |

\* cited by examiner

*Primary Examiner* — Siu M Lee
(74) *Attorney, Agent, or Firm* — Hauptman Ham, LLP

(57) ABSTRACT

Disclosed is a device that multiplies a first signal outputted from a CTLE and a second signal obtained by delaying the first signal by a predetermined time interval; produces a specific signal reflecting a temporal sum of the multiplied signal; determines gain control signal in a manner such that the difference between the specific signal and a predetermined target level is reduced; and provides the determined gain control signal to the CTLE so as to be applied to high-band boosting thereof. The time interval to be delayed corresponds to N (N is an integer equal to or greater than one) times a unit interval that is occupied by one symbol in the first signal.

18 Claims, 10 Drawing Sheets

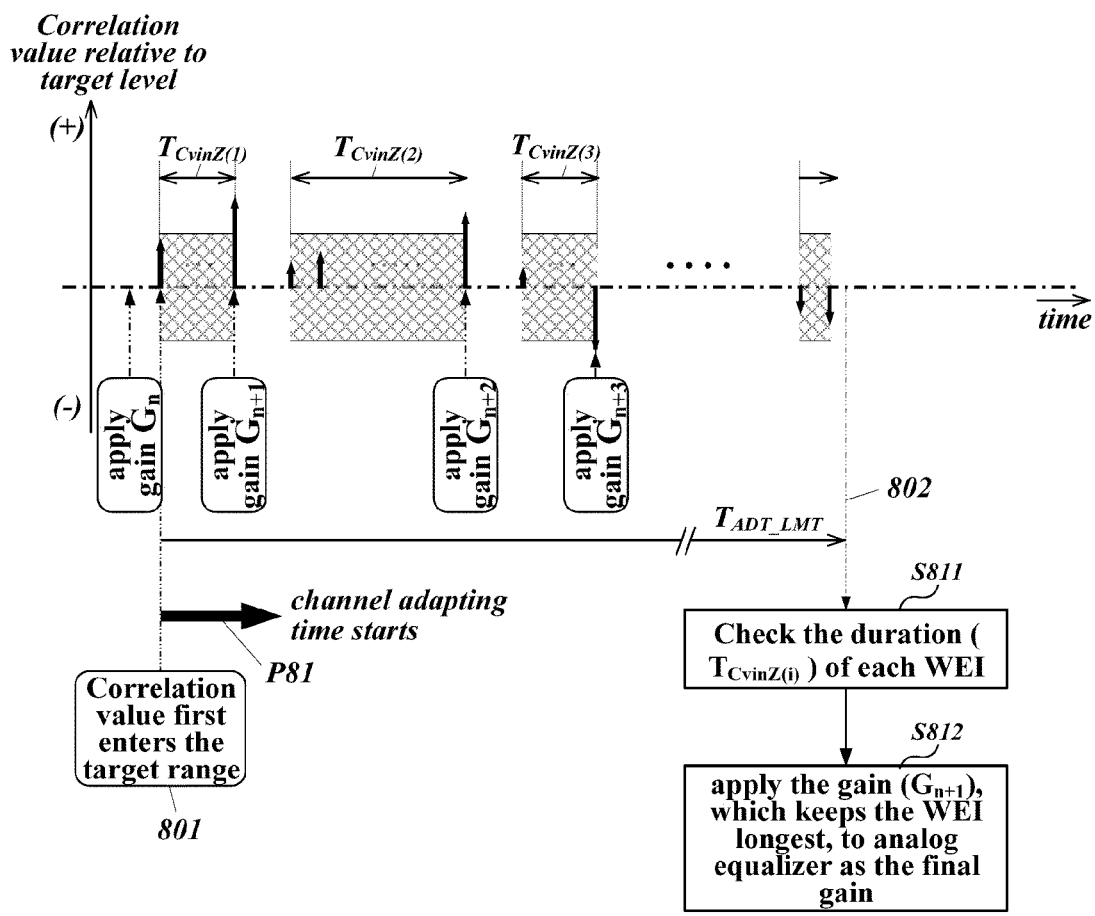

METHOD FOR COMPENSATING LOSS OF HIGH-SPEED SIGNALS IN A COMMUNICATION CHANNEL, AND A DEVICE FOR SAID METHOD

CROSS REFERENCE TO RELATED APPLICATION

This application claims the priority of Korean Application No. 10-2020-0128458, filed on Oct. 6, 2020. The entire disclosure of the above application is incorporated herein by reference.

BACKGROUND

Field

The present invention relates to a technology for compensating a loss caused in a communication channel for high-speed data signals when those are received through a communication channel formed between a transmitter and a receiver, and more particularly, to a method and a device of determining how much to compensate for frequency components lost due to a characteristic of a communication channel.

Description of the Related Art

In general, digital data communication between a transmitter and a receiver is performed in such a manner that a receiver samples a signal transmitted through an assigned communication channel or a connected transmission line between them and restores the transmitted bit stream from the sampled data.

However, the signal carrying data is distorted or damaged in the communication channel due to inter-symbol interference, noise, or frequency characteristics of a physical transmission path, etc., and such loss has a negative effect on the receiver when restoring the original bit stream from the received signal.

Furthermore, if digital data transmitted through a communication channel is at a high speed, for example, more than several tens of Gbps, such negative effect is inevitably large.

The reason is that, as illustrated in FIG. 1A, in the case of high-speed data transmission, the signal waveform 1 transmitted in the base-band transmission manner has an extremely short Unit Interval (UI), and therefore, if the components of high-frequency band are lost due to the characteristics of a transmission channel, the transmitted signal would be received as a waveform 2 where the original shape is almost lost.

In general, a receiver is equipped with an equalizer for reducing the occurrence of errors in digital data recovery by adaptively compensating for signal loss caused in a communication channel. The operation of such an equalizer compensates for signal loss in a channel, to some extent, which the signal is transmitted through, thereby lowering the probability of occurrence of errors in digital data restoration. However, if the received signal waveform is severely damaged or distorted as illustrated in FIG. 1A, there is a limit to lowering the probability of error occurrence. Moreover, in the case of an equalizer that adaptively compensates for the loss characteristic of a transmission channel, the time required for estimating the degree of compensation suitable for a loss occurring in the transmission is inevitably lengthened.

In order to alleviate such burden in signal processing for digital data restoration, a method of compensating a signal carrying digital data in an analog manner prior to digital signal processing is used. The signal compensation method in analog manner is to amplify a specific high frequency band designated in the entire band of a received signal, and a device conducting such boosting a high frequency band is generally referred to as Continuous-Time Linear Equalizer (CTLE). In order to refer to the CTLE distinguishably from an equalizer that digitally performs an operation of setting equalization coefficients through adaptive training on sampled digital signals at a stage after the CTLE, it is specifically referred to as an 'analog equalizer' in this specification. And, the signal compensation operation, conducted by the analog equalizer, of boosting high frequency components of an input signal by a gain set from the outside is referred to as 'Analog Linear Equalization' (ALE) or abbreviated as 'Linear Equalization' (LE).

In a receiver that receives a high-speed signal transmitted from a transmitter, the high-frequency signal components, which might be lost due to channel characteristics, in the received signal can be compensated to some extent by setting appropriately the high-frequency band amplification ratio, that is, the gain to a control pin prepared on the analog equalizer for gain adjusting. If the signal waveform is compensated by such LE prior to the restoration of digital data, the signal processing burden in the digital data restoration process to be performed in the subsequent stage is greatly reduced.

However, in the case that a receiver is applied to a communication environment where the characteristics of the transmission channel cannot be measured and understood in advance, the LE of an analog equalizer for compensating loss of a high-speed signal caused in an arbitrary transmission channel may exceed the suitable compensation level. FIG. 1B shows a simple example for this case.

As illustrated in FIG. 1B, if the ALE for a signal 2 of which high-frequency components are partially lost in a transmission channel is excessive compared to the loss characteristic of the transmission channel, the section 10 around each edge of the compensated signal 3 may be excessively deformed out of the desired shape of waveforms to be obtained by proper ALE. If the ALE is excessive compared to the loss in this way, the utility of an analog equalizer adopted in a receiver is hardly attainable.

Therefore, in the case of a receiver applied to a communication environment where the characteristics of a transmission channel cannot be known in advance, it is essential that the degree of compensation by the ALE of the analog equalizer is to be automatically set to suitable for the loss characteristics in the channel.

In accordance with such technical requirements, several inventions such as Korean Patent Publication No. 10-2018-0012808 and US Patent Publication No. 2013/148712 (PCT Application No. PCT/US2016/016872), etc. have been developed and filed.

The above inventions propose a method of setting a gain for LE of an analog equalizer to be suitable for the loss characteristics of a transmission channel while estimating the loss extent in the transmission channel from signals being received in a communication environment where the loss characteristics of the transmission channel used are not known.

The method proposed by those inventions is to set a gain of an analog equalizer based on a difference between a signal (an output signal of a slicer in the above-mentioned prior inventions) of a digital bit or a digital symbol sequence restored from a received signal and a signal waveform before restoration.

However, in the method proposed by the preceding inventions, it needs a premise that digital bit stream or symbols carried in a received signal are correctly restored from the received signal. This premise means that the time to be taken until an equalizer converges its own equalization coefficients through training process is required prior to the ALE in order that the accuracy of the restoration into bit stream or symbols is guaranteeable to a sufficient extent. Moreover, those prior inventions require the reliability of signal processing results at the following stage in determining the compensation characteristic of a device that processes a received signal at the preceding stage.

Therefore, those inventions of prior art have a problem in that the gain for ALE with respect to the loss characteristic of a transmission channel is not quickly determined. The interdependence that requires reliability in data recovery at the following stage when determining how much compensation is made for an input signal causes the decision of gain for ALE suitable for the loss characteristics of a transmission channel to be even more delayed.

Moreover, because in the above prior inventions, how much to compensate by an analog equalizer is determined on the basis of digital data (bit stream or symbols) restored from a received signal, the circuit for determining the compensation degree must be configured relatively complex, which is also a disadvantage.

SUMMARY OF THE INVENTION

It is the first object of the present invention to provide method and device for determining the degree of compensation for loss in a communication channel irrespective of data restored from a received signal.

It is the second object of the present invention to provide method and device for allowing the degree of ALE to compensate loss of a received signal in a communication channel to be determined very quickly and then applied.

It is the third object of the present invention to provide method and device that can be implemented with a relatively simple circuit in order to alleviate the loss of a received signal in a communication channel.

It is the fourth object of the present invention to provide method and device for adaptively determining the degree of ALE for compensation of signal loss in response to changes in characteristics of a communication channel.

The scope of the present invention is not necessarily limited to the above explicit statements. Rather, the scope of the present invention covers anything to accomplish effects that could be derived from the specific and illustrative explanations of the present invention below.

A device for receiving a signal transmitted through a communication channel and recovering data from the signal according to one aspect of the present invention, comprises: an equalizer configured to amplify a specific band of a signal received through the communication channel by a gain to be set by an inputted Gain Control Signal (GCS) and to output the amplified signal; a delay unit configured to delay the signal outputted from the equalizer by a predetermined first time interval; a correlator configured to multiply the signal outputted from the equalizer and the signal outputted from the delay unit, and to output a specific signal reflecting a temporal sum of a first signal that is produced by the multiplying; and a control unit configured to determine the GCS in a manner such that a difference between the specific signal and a predetermined target level is reduced, and to provide the determined GCS to the equalizer so as to be applied to the amplifying thereof, wherein the first time interval corresponds to N (N is an integer equal to or greater than one) times a unit interval that is occupied by one symbol in the signal received through the communication channel.

In one embodiment of the present invention, the control unit stops, at least temporarily, an adapting operation of determining the GCS depending on the specific signal and providing the determined GCS to the equalizer, if it is confirmed that an inverse section where the specific signal changes from a value lower than the target level to a value higher than the target level or vice versa, or that the inverse section appears more than a predetermined number of times.

In another embodiment of the present invention, the control unit stops, at least temporarily, the adapting operation if a condition that the specific signal is maintained within a preset target range for longer than a predetermined reference time or that the specific signal is maintained for longer than a predetermined reference time without deviating from a preset target range for longer than an allowed time is satisfied. In the present embodiment, if the condition is not satisfied until a specified time limit has elapsed, the control unit stops the adapting operation at least temporarily, after causing a particular GCS to be applied to the amplifying of the equalizer, the particular GCS being a GCS provided to the equalizer just before start of an interval that the specific signal is kept longest within the target range during the time limit.

In another embodiment of the present invention, the control unit measures duration of a particular interval that the specific signal is maintained within a predetermined target range whenever the particular interval occurs until a predetermined adapting time elapses. When the adapting time has elapsed, the control unit stops the adaptive operation at least temporarily after causing a particular GCS, which is a GCS provided to the equalizer just before start of the longest duration among the measured durations, to be applied to the amplifying of the equalizer.

In the case that the adapting operation is stopped at least temporarily according to the above-explained embodiments of the present invention, the control unit may conduct the adapting operation again when a state that the specific signal is out of a preset range continues for a predetermined allowable time or longer, or when a ratio of the specific signal deviating from a predetermined allowable range during a certain period of time prior to a present time is greater than a preset limit ratio.

In another embodiment of the present invention, the control unit keeps conducting the adapting operation at least during the received signal is inputted to the equalizer.

In one embodiment of the present invention, the device is configured to further comprise at least one second delay unit, each being configured to delay the signal outputted from the equalizer by a certain time interval different from that of other delay unit. In the present embodiment, the correlator produces a second signal, for each of signals delayed and outputted by the at least one second delay unit, by multiplying a corresponding signal and the signal outputted from the equalizer; weighted-averages a temporal sum of the at least one second signal and the temporal sum of the first signal with weights assigned individually to the at least one second signal and the first signal; and outputs a signal obtained by the weighted-averaging as the specific signal. The certain time interval corresponds to K (K is an integer of one or more other than the integer N) times the unit interval, and with respect to the weight, the largest value may be assigned to a signal with the shortest delayed time among the first signal and the at least one second signal.

In the above embodiment comprising the at least one second delay unit, the correlator may produce a second signal, for each of signals that are delayed by mutually different times (each corresponds to K (≠N) times the unit interval) and outputted from the at least one second delay unit, by multiplying a corresponding signal and the signal outputted from the equalizer; divide all signals, which consist of the first signal and the at least one second signal, into a plurality of groups; and weighted-average temporal sums of one or more corresponding signals, for each of the divided groups, to be outputted. In this embodiment, the specific signal is any one of the plurality of signals, and the control unit determines the GCS based on a plurality of signals produced individually by the weighted-averaging.

In one embodiment of the present invention, the delay unit and the correlator are respectively configured to receive and process digitized signals, with respect to the signal outputted from the equalizer, sampled by an A/D converter equipped at a front end of a digital processing block that restores digital data transmitted by a transmitter by digitally processing the signal outputted from the equalizer.

A method for compensating for loss of a signal transmitted through a communication channel in accordance with another aspect of the present invention, comprises the steps of: multiplying a first signal and a second signal obtained by delaying the first signal by a predetermined first time interval, the first signal being outputted from an equalizer that amplifies a specific band of a signal received through a communication channel by a gain to be set by an inputted GCS; producing a specific signal reflecting a temporal sum of the multiplied signal; and determining the GCS in a manner such that a difference between the specific signal and a predetermined target level is reduced, and providing the determined GCS to the equalizer so as to be applied to the amplifying thereof. In this method, the first time interval corresponds to N (N is an integer equal to or greater than one) times a unit interval that is occupied by one symbol in the signal received.

In accordance with present invention described above or at least one embodiment of the present invention to be described in detail below with reference to appended drawings, a method of compensating for the loss of high-speed signals caused in a communication channel enables the ALE required for loss compensation with respect to a received signal, that is, the gain for boosting the high frequency components to be set appropriately. Accordingly, distortion of a received signal due to excessive ALE can be prevented.

In the present invention, since only a received signal having not undergone the restoring process is used without a signal of bits or symbols restored by digitally processing, no time is required for the adaptive equalization conducted in a digital processing block responsible for the restoration of digital data equipped in a receiver to be stabilized. For this reason, the degree of LE for an input signal is determined very fast and then applied to compensate for a received signal. This shortens a channel adapting time of the digital processing block, which processes a signal after the ALE, as much as the faster time.

Further, a method according to the present invention for determining a boosting gain for high frequency components using not a signal restored by a digital processing block but a signal before that block can be implemented with a simpler circuit than the conventional one. Therefore, a device for controlling the ALE of an analog equalizer can be produced and supplied at a relatively lower price.

BRIEF DESCRIPTION OF THE DRAWINGS

FIG. 8 schematically illustrates a method of determining and applying a gain of the most stable LE within a given time according to another embodiment of the present invention;

DETAILED DESCRIPTION

Figure 1A:
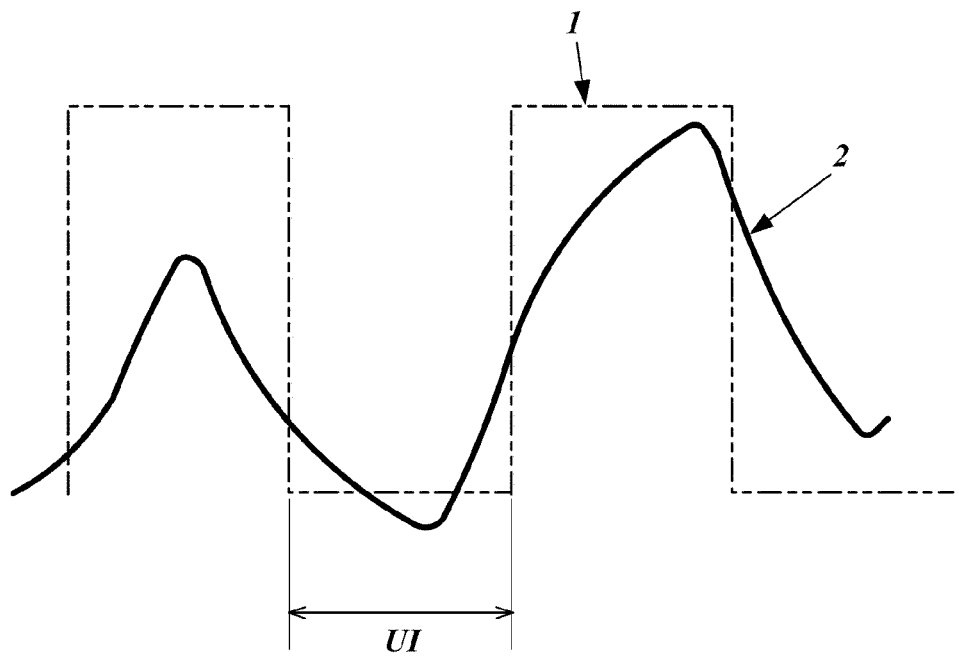
FIGS. 1A and 1B are diagrams showing, as simple examples, a signal waveform due to a loss of high frequency components caused when a high-speed signal is transmitted through a communication channel, and another waveform obtained from boosting high frequency components to compensate for the loss of a signal.
Figure 1B:
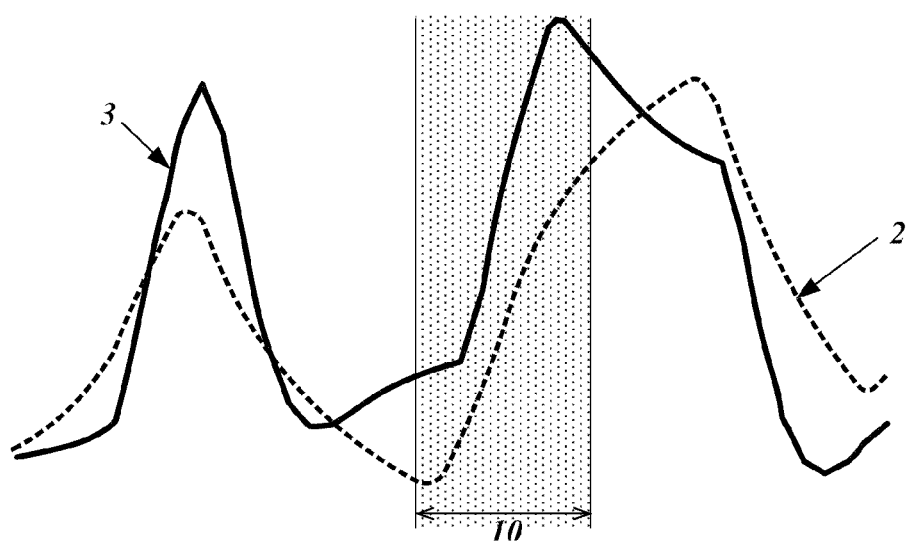

In what follows, embodiments of the present invention will be described in detail with reference to appended drawings.

In the following description of the embodiments of the present invention and the accompanying drawings, the same reference numerals or symbols designate the same elements unless otherwise specified. Of course, for convenience of explanation and for the sake of understanding, the same components may be indicated by different reference numbers or symbols if necessary.

Figure 2:
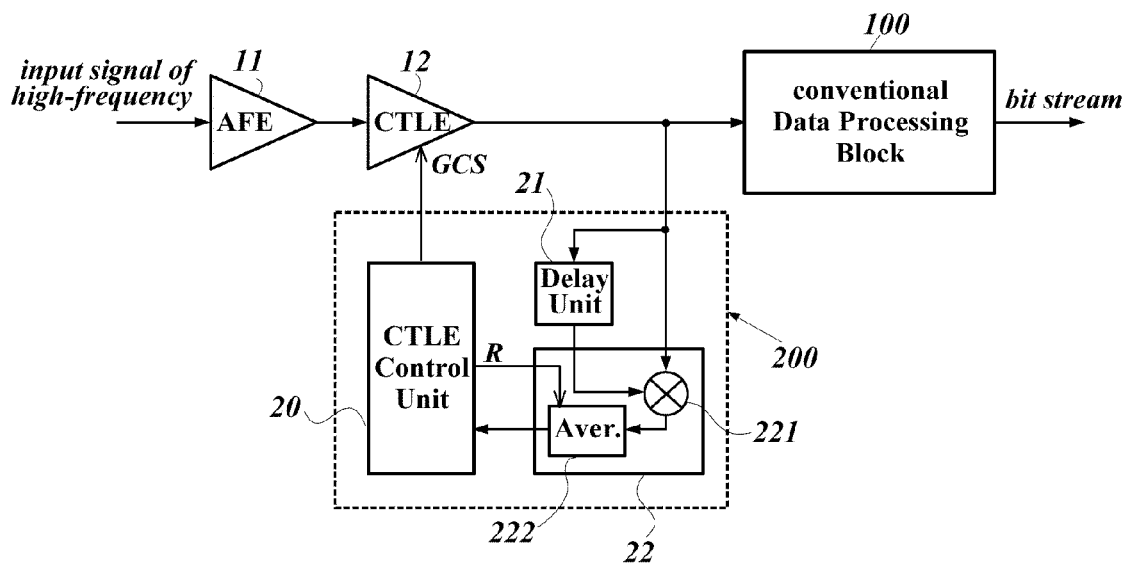
FIG. 2 illustrates an example of a configuration of a data receiver in which a method for compensating for loss of a high-speed signal caused in a communication channel is implemented according to an embodiment of the present invention.

FIG. 2 illustrates an example of the configuration of a data receiver in which a method for compensating for loss of a high-speed signal caused in a communication channel is implemented according to an embodiment of the present invention.

The data receiver shown in the figure comprises: an Analog Front End (AFE) unit 11 for amplifying a signal, especially a high-frequency signal of several GHz or higher received through a transmission channel while allowing signal of a predetermined band to be passed; an analog equalizer 12 for boosting a preset high-frequency band of an input signal, depending upon a Gain Control Signal (GCS) inputted from the outside, and then outputting the signal; and a general digital processing block 100 that demodulates digital data from the output signal of the analog equalizer 12. The digital processing block 100 may be generally embodied with an A/D converter, an equalizer, a matching filter, a bit-decision unit such as a slicer, and the like.

The receiver of FIG. 2, configured in accordance with the present invention, includes an Analog Equalization Control Unit (AECU) 200, in addition to such conventional components.

The AECU 200 comprises: a delay unit 21 that delays an output signal of the analog equalizer 12 by a preset interval and then outputs it; a correlator 22 that obtains and outputs a correlation value with respect to the output signal of the analog equalizer 12; and a control unit 20 that determines a boosting gain for a preset high-frequency band of the analog equalizer 12 based on a signal of the correlation value provided by the correlator 22. The correlator 22 consists of a multiplying unit 221 that outputs a signal obtained by multiplying the output signal of the analog equalizer 12 and the output signal of the delay unit 21, and an averaging unit 222 that averages the output signal of the multiplying unit 221 while outputting the averaged signal.

Figure 3:
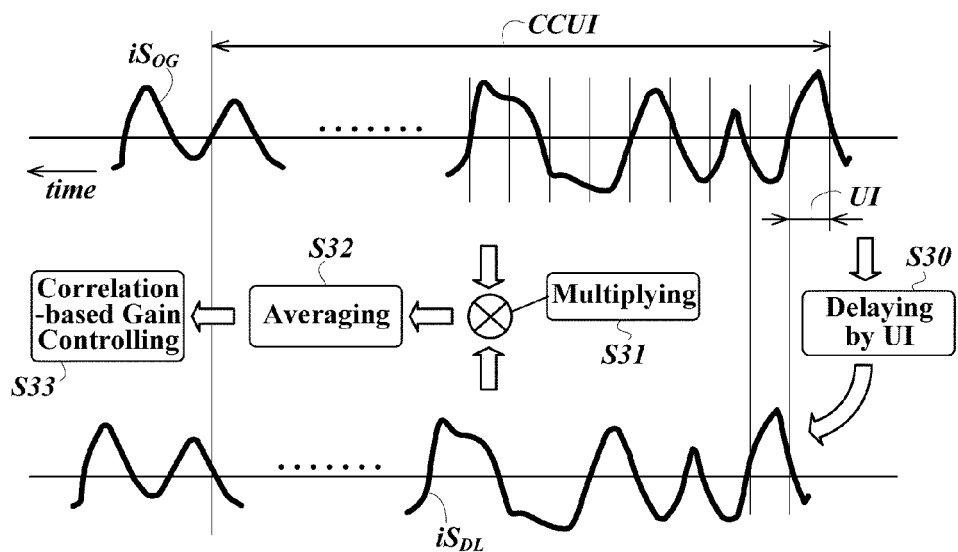
FIG. 3 schematically shows the concept of an operation of the ALE controller of FIG. 2.
Figure 4:
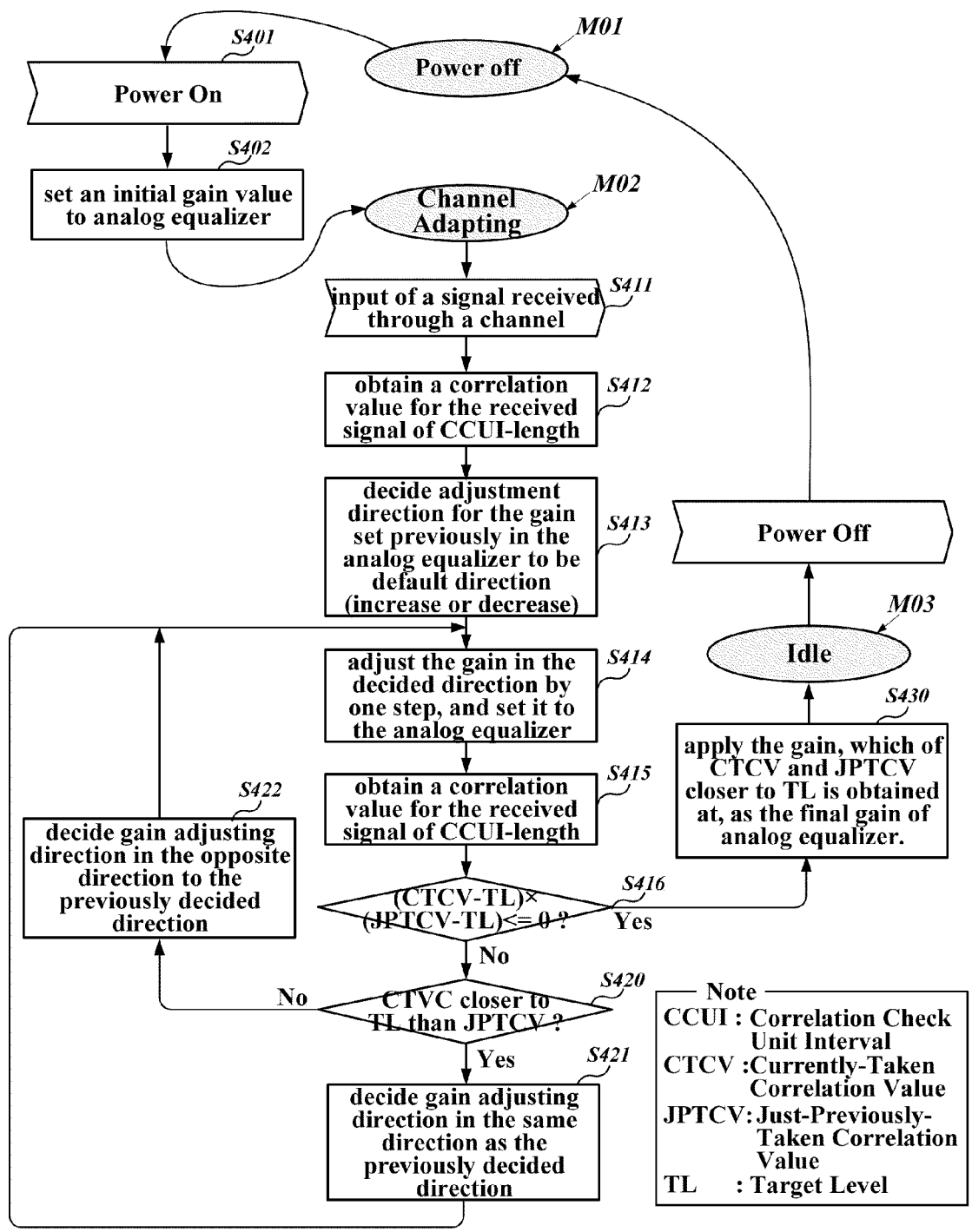
FIG. 4 is a state diagram illustrating a method of determining and setting a high-band amplification gain for signal compensation of an analog equalizer according to an embodiment of the present invention.
Figure 5A:
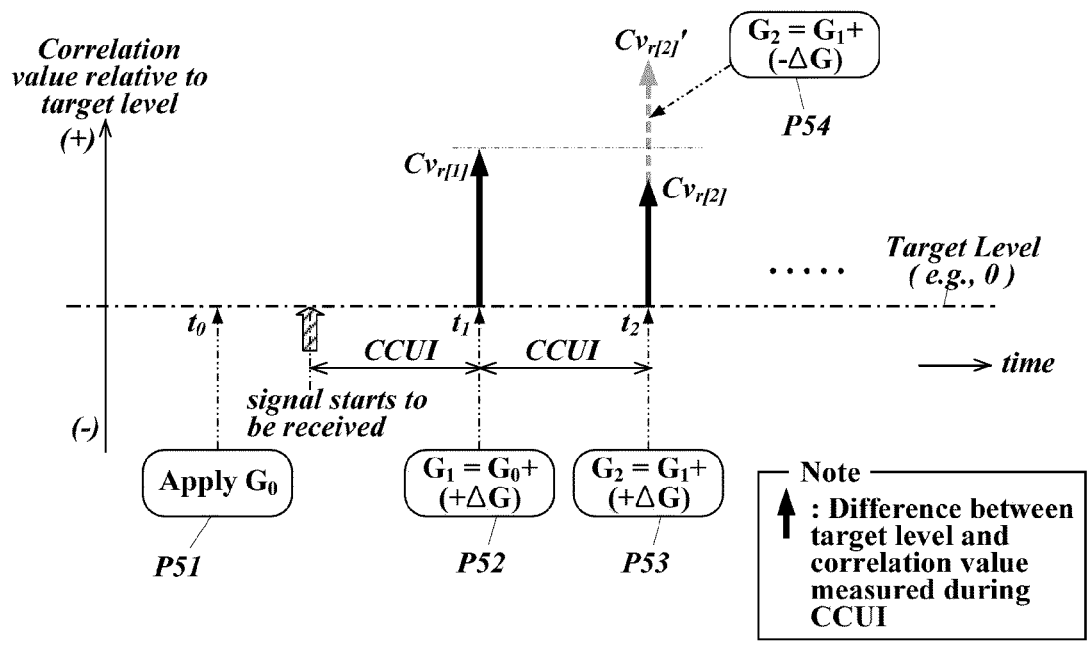
FIGS. 5A and 5B schematically show a process in which an amplification gain for optimal compensation for a received signal is determined by an operation according to the state diagram of FIG. 4.
Figure 5B:
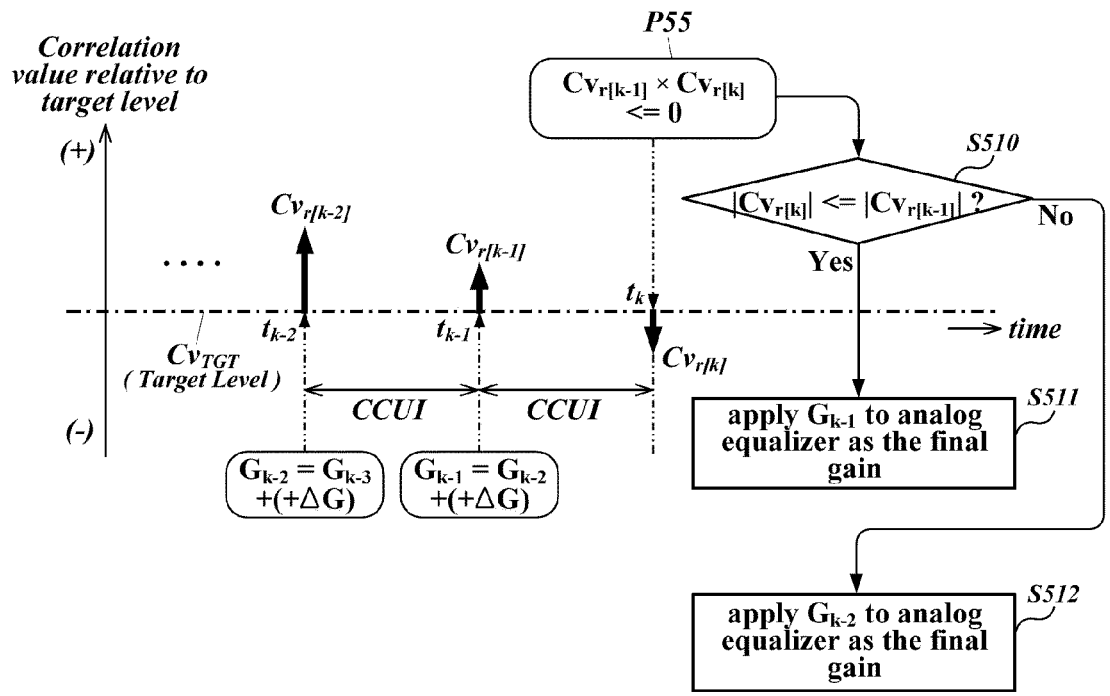

FIG. 3 schematically shows the concept of an operation of the AECU of FIG. 2, and FIG. 4 is a state diagram illustrating a method of determining and setting a boosting gain for a high-frequency band of an analog equalizer 12 according to an embodiment of the present invention. FIGS. 5A and 5B schematically show a process in which a boosting gain for optimal compensation for a received signal is determined by the method of which state diagram is shown in FIG. 4. Hereinafter, various embodiments of determining a boosting gain for linearly equalizing an analog signal to compensate for loss in a high band of a high-speed signal caused during transmission through a communication channel according to the present invention will be described.

First, an embodiment of the present invention illustrated in FIGS. 4, 5A and 5B will be described in detail.

When power is supplied to the receiver of FIG. 2 in the power-off state M01 (S401), the control unit 20, in the process of initializing the components, sets an initial gain value $G_0$, which is previously specified, to the analog equalizer 12 (S402, P51) and enters the channel adapting mode M02.

When a signal transmitted from a transmitter through a transmission channel is received in the channel adapting mode M02, the received signal is inputted to the AECU 200 after necessary amplification and filtering by the AFE unit 11 and the analog equalizer 12 (S411). The signal inputted at this time is a signal of which the high frequency components are compensated by an arbitrary initial gain value $G_0$ set in the initializing process. The control unit 20 obtains a correlation value for the input signal $iS_{OG}$ during a predetermined Correlation Checking Unit Interval (CCUI) that is produced from the following process carried out by the elements placed in front of itself.

When the signal whose high frequency components are arbitrarily compensated by the initially-set gain $G_0$ is inputted, the delay unit 21 outputs the input signal $iS_{OG}$ while delaying it by a predetermined UI. The width of the UI by which the input signal $iS_{OG}$ is delayed at this time corresponds to a time width occupied by one symbol in the input signal. Here, one symbol may be information of a single bit or, depending on a modulation scheme, two or more bits.

The multiplying unit 221 multiplies the input signal $iS_{OG}$ and the delay signal iSDG with each other (S31) and outputs the multiplied signal. The averaging unit 222 outputs a signal reflecting temporal sum of the multiplied signal outputted from the multiplying unit 221 (S32). The averaging unit 222 temporally accumulates the multiplied signal and divides the accumulated signal by a corresponding time to output an average signal as the signal reflecting temporal sum of the multiplied signal. To this end, the averaging unit 222 may consist of an integrator and a division circuit.

Meanwhile, in the channel adapting mode M02, the control unit 20 activates a reset signal to the averaging unit 222 every CCUI. Whenever the reset signal is activated, the averaging unit 222 restarts the averaging of temporal sum of the multiplied signal from the initial value (e.g., zero) with respect to the signal being averaged and outputted.

And, immediately before activating the reset signal to the averaging unit 222, the control unit 20 reads the current value of the signal outputted from the averaging unit 222 and takes it as a correlation value of the signal outputted from the analog equalizer 12. The correlation value is used as the basis for controlling the high-band amplification gain of the analog equalizer 12.

The term of a 'correlation value' to be used in the present specification refers, unless otherwise noted, to a value obtained by subtracting a preset target level from a value currently read from the averaging unit 222, as illustrated in FIGS. 5A and 5B. The target level means a value corresponding to the magnitude of DC component carried in the received signal $iS_{OG}$. If there is no DC component, the zero is applied as the target level. Otherwise, the magnitude of DC component is applied as the target level.

The operation of the control unit 20 to apply a reset signal every CCUI after reading the correlation value from the averaging unit 222 continues until it is determined that LE has been completed while controlling the gain of LE (hereinafter abbreviated as 'Equalization Gain' (EG)) depending upon the read correlation value. The process of the control operation for such channel adaptive loss compensation will be described from the beginning.

When the first correlation value $Cv_{r[1]}$ is taken in the channel adapting mode M02 (S412), the control unit 20 decides an adjusting direction (a direction means to increase or decrease the EG), which is to be applied in adjusting the initial EG $G_0$ arbitrarily set to the analog equalizer 12, as a preset default direction (S413, P52). The default direction may be a direction to increase the EG as illustrated in FIG. 5A.

After deciding the adjusting direction in this way, the control unit 20 determines the EG ($G_1=G_0+\Delta G$) by adjusting the current EG $G_0$ by one step ($\Delta G$, for example, 1 dB) in the decided direction, and applies the GCS for setting the determined EG $G_1$ to the analog equalizer 12 (S414). After adjusting the EG of the analog equalizer 12 in this way, the control unit 20 takes again a correlation value $Cv_{r[2]}$ or $Cv_{r[2]}'$ during the next CCUI, as described above, with respect to the linearly-equalized signal outputted from the analog equalizer 12 (S415).

When the correlation value of the received signal is taken after the EG is adjusted, the control unit 20 determines, based on the Currently-Taken Correlation Value (CTCV) $Cv_{r[2]}$ or $Cv_{r[2]}'$ and the Just-Previously-Taken Correlation Value (JPTCV) $Cv_{r[1]}$, whether to re-adjust the EG or complete the gain adjustment with the currently-set EG. In more detail, as illustrated in FIG. 5B, the control unit 20 first checks whether the signs of the CTCV (specifically, a first value obtained by subtracting the aforementioned target level from the value taken from the averaging unit 222) and the JPTCV (specifically, a second value obtained by subtracting the aforementioned target level from the value taken from the averaging unit 222 immediately before) are different from each other (S416).

If the signs of both correlation values (specifically, the first value and the second value) are the same, the control unit 20 checks which of the CTCV and the JPTCV is closer to the target level (S420). That is, it checks which correlation value is smaller in magnitude ($|Cv_{r[i]}|$, i=1, 2, 3, . . . ). In this checking, if the CTCV is closer to the target level than the JPTCV (in the case that $Cv_{r[2]}$ is obtained in FIG. 5A), the adjusting direction for the EG is decided to be the same direction as the just-previously-decided direction (S421, P53). Alternatively, if the JPTCV is closer to the target level (in the case that $Cv_{r[2]}'$ is obtained in FIG. 5A), the adjusting direction is decided to be an inverse direction which is opposite to the just-previously-decided direction (S422, P54). That is, if the EG was increased immediately before, it is decided to increase the EG in the former case, and it is conversely decided to decrease the EG in the latter case.

After the direction for adjusting the EG is decided in this way, the control unit 20 provides the GCS corresponding to the adjusted EG to the analog equalizer 12 (S33, S414) so that the EG adjusted from the currently-set EG by one step $\Delta G$ in the decided direction is applied.

If the CTCV becomes the opposite sign from the JPTCV or becomes zero (S416, P55), in other words, if the CTCV becomes a higher value than the target level or zero under the condition that the JPTCV is lower than the target level, or if the CTCV becomes a lower value than the target level or zero under the condition that the JPTCV is higher than the target level, while the process of adaptively adjusting, based on the obtained correlation values, the EG of the analog equalizer 12 to compensate for the high frequency components continues as described above, the control unit 20 checks which one of the CTCV $Cv_{r[k]}$ taken at the current time point $t_k$ and the JPTCV $Cv_{r[k-1]}$ is closer to the predetermined target level (S510). Afterward, it determines the EG, which the correlation value closer to the target level is obtained at, as the final gain of the analog equalizer 12 to be applied thereto (S430). That is, the control unit 20 maintains the EG $G_{k-1}$ set currently in the analog equalizer as it is (S511), or adjusts the EG by returning to the EG $G_{k-2}$ set immediately before setting the current EG (S512). The former case is that the CTCV is closer to the target level than the JPTCV ($|Cv_{r[k]}|\leq|Cv_{r[k-1]}|$), and the latter case, vice versa ($|Cv_{r[k]}|>|Cv_{r[l-1]}|$). After the final gain of the analog equalizer 12 is applied, the control unit 20 enters an idle mode M03 and completes the EG control operation for adapting to the high-band loss characteristics of a communication channel.

In another embodiment according to the present invention, the final EG is not determined immediately when the sign of the correlation value being taken successively is inversed. Instead, the final EG is determined in the same way as explained above when the interval in which the sign of the correlation value is inversed appears more than a predetermined number of times. In this specification, the term 'inverse' of a sign is used as a meaning including even a case in which a subsequent correlation value becomes zero. In this embodiment, instead of deciding the adjusting direction based on the magnitude of the successive correlation values, as described above, when a correlation value of which the sign is inversed is taken, the adjusting direction may be decided as opposed to the direction to which adjustment was made just before sign inverse. That is, if a correlation value whose sign is inverted is taken in the state of having increased the EG when the JPTCV was obtained, the EG decreased by the one step from the previously-adjusted EG is determined to be applied to the analog equalizer 12 at this time.

As described above, the control unit 20 adaptively adjusts the EG of the analog equalizer 12 based on the correlation values to reduce the magnitude of the correlation value (to make difference from the target value be smaller) whenever a correlation value of a received signal is obtained. As a result, the high-band of a received signal is compensated to the most appropriate extent in the analog equalizer 12.

If the high frequency components lost in a communication channel is properly compensated, not to be excessive compared to the loss, by the analog equalizer 12 with respect to the signal inputted to the receiver, the correlation values taken by the control unit 20 from the output signal of the analog equalizer 12 approaches the target value. The reason for this is that a transmitter scrambles data bits to have a feature of pseudo noise when transmitting a signal carrying them coded into the form of symbols. If a signal carrying symbols having the feature of pseudo-noise is intact, the above-described correlating the signal with the delayed signal by the UI causes the DC component carried in the signal, that is, the aforementioned target value, to appear as a correlation value. If a received signal does not contain a DC component, a correlation value obtained in the same manner as described above becomes close to zero when the analog equalizer 12 performs equalization for compensation suitable for loss of the high frequency components caused in a transmission channel.

Accordingly, after determining the final EG, as described above, while changing the EG of the analog equalizer 12 in a direction that makes the correlation value provided from the averaging unit 222 closest to the preset target value. the control unit 20 applies the final EG to the analog equalizer 12.

Figure 6:
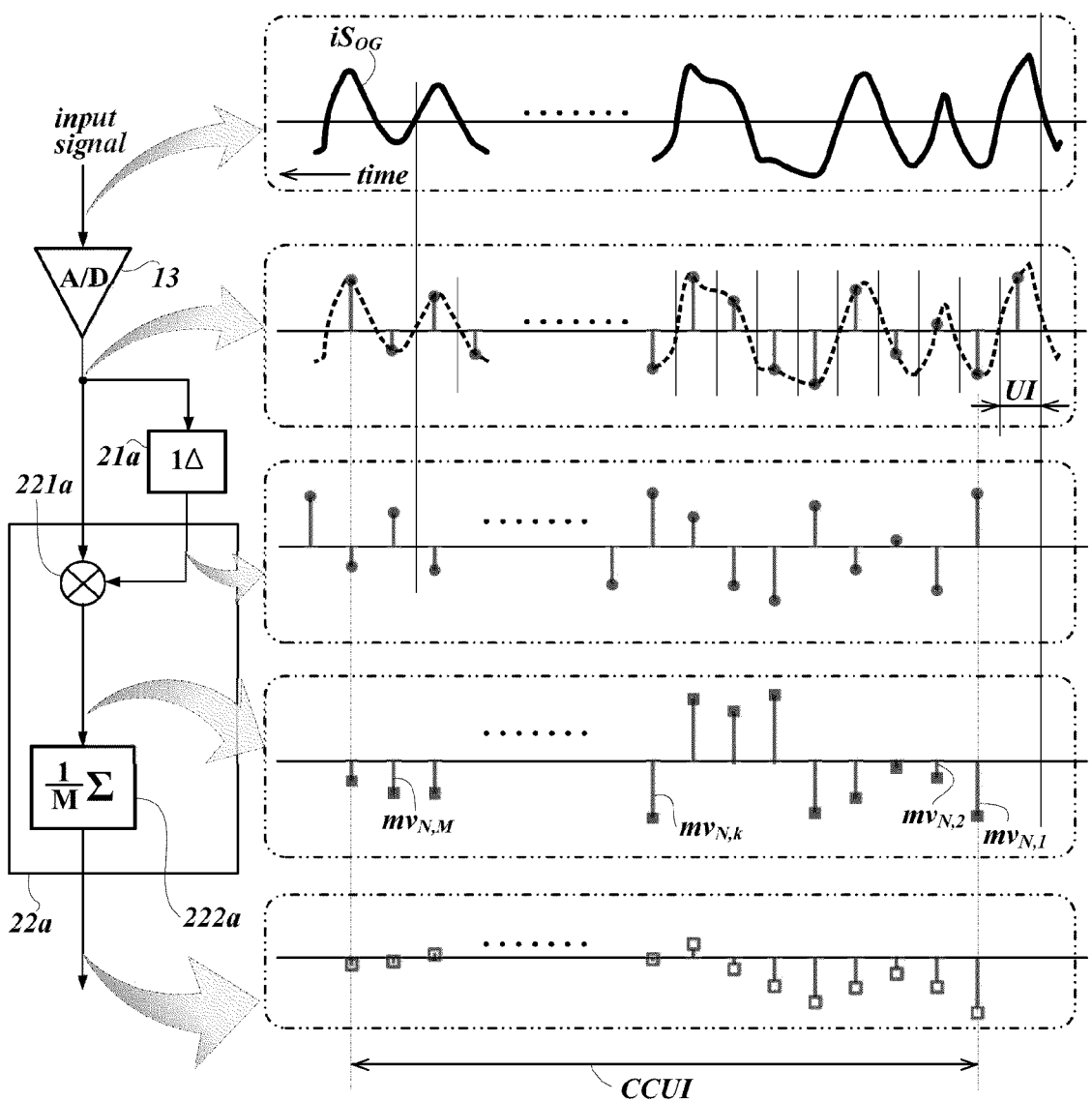
FIG. 6 illustrates a configuration of a digital circuit for obtaining a correlation value of a received signal for controlling LE according to an embodiment of the present invention, along with a process in which a digital signal is processed by each element.

In the explanation for the above embodiment, it has been described that the correlation value of the signal outputted from the analog equalizer 12 is obtained through an analog circuit, but in other embodiments according to the present invention, the correlation value may be also obtained through a digital circuit. FIG. 6 is a diagram illustrating the configuration of a circuit for obtaining a correlation value along with a process in which a digital signal is processed by each element In order to obtain the autocorrelation value for the input signal by means of a digital circuit, an A/D converter 13 for sampling the input signal is necessary. However, this A/D converter 13 does not need to be separately provided for the AECU 200. This is because an A/D converter included generally in the general digital processing block 100 equipped in a receiver can be used as it is. That is, it is because a circuit can be connected so that the output signal of an A/D converter, which is equipped in the digital processing block 100 and configured to sample a received signal and output the sampled signals to be restored into digital data at the later stage, is also inputted to the AECU 200. If a general circuit block for restoring transmitted data from a received signal does not include an A/D converter, the AECU 200 includes the A/D converter 13 separately to obtain correlation values of an input signal in a digital manner.

In the configuration of the AECU as illustrated in FIG. 6, the delay element 21a delays and outputs sampled digital values (hereinafter, abbreviated as 'sample values') being inputted sequentially as delaying each of them by the UI. If sampling is made once for the UI as illustrated in FIG. 6, the previously-inputted sample value is outputted the moment the next sample value is entered. If sampling is made more than once for the UI, one sample value is outputted each time one sample value is entered, starting from when the number of input sample values reaches the number of sampling times in the UI.

The multiplying unit 221a of the correlator 22a outputs a value obtained by multiplying both sample values inputted at the same time point. Both sample values to be multiplied with each other are a sample value directly inputted at the same time as being sampled from the input original signal $iS_{OG}$, and another sample value outputted from the delay element 21a. The adding/averaging unit 222a sequentially outputs values, each of which corresponds to a running average, obtained by dividing added multiplication values by the number of the added values as adding the multiplication values outputted sequentially from the multiplying unit 221a.

As in the operation of the AECU configured as illustrated in FIG. 2, the adding/averaging unit 222a also initializes the current moving average to zero, and then calculates a moving average newly for the multiplied values inputted sequentially thereafter, whenever a reset signal is activated from the control unit 20

Even in the AECU configured to include the circuit configuration as shown in FIG. 6, the control unit 20 controls the EG in the same manner as described above. That is, the control unit 20 reads the output value (This read value corresponds to a correlation value for a CCUI with respect to the output signal of the analog equalizer 12.) of the adding/averaging unit 222a just when the CCUI elapses, and adaptively controls the EG of the analog equalizer 12 based on the read value in order to apply the most appropriate final EG to the analog equalizer 12, In the above-described embodiment, when the condition that the adjacent correlation values obtained for the received input signal changes up and down or vice versa on the basis of the target value is satisfied, the AECU 200 configured as shown in FIG. 2 or 6 determines the final EG for the analog equalizer 12 and then applies the determined final EG thereto. However, such condition may be momentarily satisfied even if the compensation for the loss of the received signal in high band is not adjusted to an appropriate extent. Hereinafter, other embodiments in which the final EG of the analog equalizer is determined after confirming that the compensation for the loss of high-band is certainly appropriate will be described.

Figure 7A:
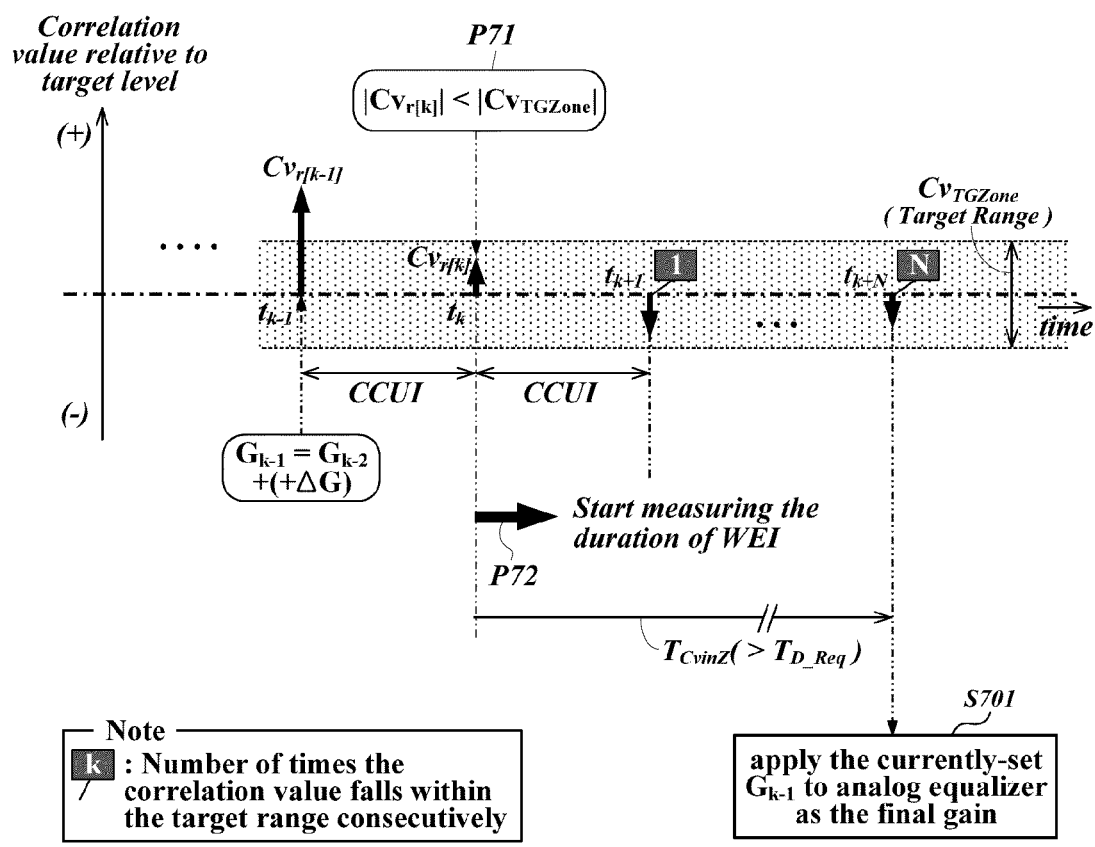
FIGS. 7A and 7B schematically illustrate a method of determining a gain of the ALE that compensates for a high band of a received signal to be a more stable value according to another embodiment of the present invention.
Figure 7B:
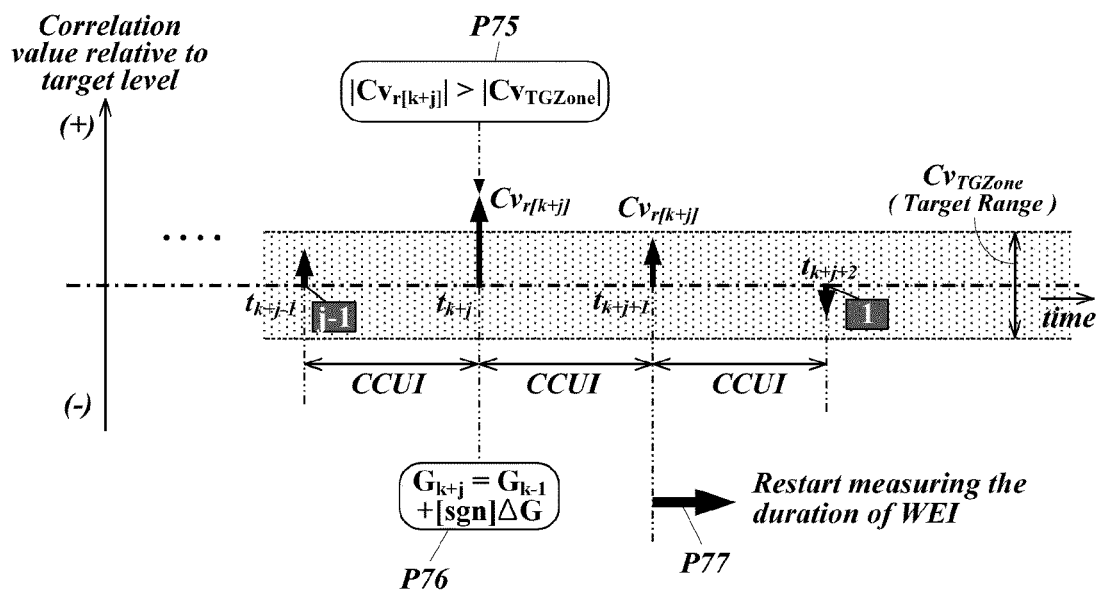

FIGS. 7A and 7B schematically illustrate an embodiment of the present invention in which a final EG for compensation for loss of a high-band is determined when correlation values continue within a proper range for a predetermined time or longer.

The control unit 20 obtains, as described above, a correlation value for the signal outputted from the analog equalizer 12 every UI, and checks whether the obtained value falls within a preset target range.

If it is confirmed that the current correlation value $Cv_{r[i]}$ (i= . . . , k−1, k, . . . ) belongs to the target range $C_{VTGZone}$ (P71) while continuing such checking, the control unit 20 starts, at that time, measuring an interval in which the correlation values keep being within the target range (P72). This interval is referred to as a Well-Equalized Interval (WEI) in this specification. As one method of measuring the interval, the number of times that the obtained correlation values successively fall within the target range is counted as illustrated in FIG. 7A. In this embodiment in particular, the adaptive EG adjustment described above is not conducted at each of the time points ti (i=k, k+1, . . . , k+N) when a correlation value is confirmed to be within the target range.

If the time measured in this way for the WEI $T_{CvinZ}$ in which the correlation values are maintained within the target range becomes longer than the predetermined reference time $T_{D\_Req}$, for example, if the count for the number of times the correlation values are consecutively within the target range exceeds a predetermined reference number, the control unit 20 determines the EG currently set in the analog equalizer 12 as the final EG (S701).

In the embodiment according to the present invention, if the series of correlation values having been maintained within the target range become out of the target range at some point as illustrated in FIG. 7B, (P75), the control unit 20 stops the above-mentioned measurement of the time maintained within the target range, and adjusts and sets the EG at that time point $t_{k+j}$ (P76).

At this time, the adjusting direction for the EG is decided, depending on whether the signs of the correlation value $Cv_{r[k−1]}$ taken ($t_{k−1}$ in FIG. 7A) just before entering the target range and the current correlation value $Cv_{r[k+j]}$ are identical or not, as the same or opposite direction to the direction in which the EG was changed immediately before. More specifically, if the signs are identical to each other, the adjusting direction is decided in the same direction as the direction in which the EG was adjusted just before, and if the signs are opposite to each other, the opposite direction is decided. In the illustration of FIG. 7B, since the correlation value $Cv_{r[k+j]}$ having exceeded the target range is the same sign as the correlation value $Cv_{r[k−1]}$ taken just before entering the target range, that direction, namely, the gain increase that was applied just before $t_{k−1}$, is decided for the EG adjustment. When the adjusting direction is decided in this way, the control unit 20 inputs the GCS for applying the EG $G_{k+j}$, which is increased or decreased by one step $\Delta G$ from the EG $G_{k−1}$ applied just before, to the analog equalizer 12.

By doing so, when the obtained correlation value enters the target range again, the control unit 20 restarts the measurement of the WEI where the correlation values maintain within the target range (P77). And, if the time to be measured again becomes longer than the reference time $T_{D\_Req}$, the final EG is then determined as described above.

In another embodiment according to the present invention, unlike the example illustrated in FIG. 7B, even if the obtained correlation values having been within the target range become out of the target range at some point, the control unit 20 may not perform the operation of adjusting and setting an EG after stopping measurement of duration of the WEI. In this embodiment, a Deviation Allowable Time (DAT) is used instead as follows. When the correlation values being taken deviate successively from the target range for longer than the DAT, as a more specific example, when the number of times that the correlation values being taken keep deviating continuously from the target range becomes more than the number preset for allowable consecutive deviations, the control unit 20 stops measuring the time during which the correlation values continue within the target range, and adjusts the EG to be applied to the analog equalizer 12 as described with reference to FIG. 7B.

On the other hand, in some communication environments to which the embodiment described with reference to FIGS. 7A and 7B is applied, it may be repeated that the obtained correlation values do not persist within the target range for more than the reference time $T_{D\_Req}$, and temporarily deviate from the target range in the middle. In order to cope with such a communication environment, in an embodiment according to the present invention, checking whether the correlation values last longer than the reference time $T_{D\_Req}$ within the target range is performed only until a preset Adaptation Time Limit (ATL). And, when the ATL is over, the final EG is determined based on the result obtained from the checking up to then. FIG. 8 schematically shows a method in which the EG is finally determined and applied according to the present embodiment.

In the embodiment according to FIG. 8, when the correlation value belonging to the target range is first taken (801), that time point is set to the starting point of the channel adapting time (P81) that is to be compared with the ATL to check whether the channel adapting time being elapsed is greater than the ATL. After the starting point is set, each time the correlation values are successively maintained within the target range, the corresponding interval $T_{CvinZ(i)}$ (i=1, 2, 3, . . . ) and the EG, which is set to the analog equalizer 12 immediately before that interval, are recorded. If that interval becomes longer than the reference time $T_{D\_Req}$, the EG is finally determined and applied as described above, and the channel adapting mode M02 is terminated.

Otherwise, if the channel adapting time being elapsed becomes longer than the ATL $T_{ADT\_LMT}$ (802) while the WEI that does not exceed the reference time $T_{D\_Req}$ is repeated, the control unit 20 examines those WEIs $T_{Cvinz(i)}$ (i=1, 2, 3, . . . ), which have appeared repeatedly during the ATL, to find the longest WEI (S811). Then, it determines the EG, which is recorded with the found longest WEI, to be applied finally to the analog equalizer 12 (S812). That is, the EG set to the analog equalizer 12 just before the longest WEI starts is determined as the final EG. If the current EG set to the analog equalizer is not the final EG, the control unit 20 naturally inputs a necessary GCS to the analog equalizer 12 so that the determined final EG is applied.

In the embodiment according to the present invention illustrated in FIG. 8, only in the event that a WEI longer than the reference time $T_{D\_Req}$ does not occur in the middle, the optimal EG is finally determined when the ATL $T_{ADT\_LMT}$ expires. However, in another embodiment according to the present invention, the aforementioned reference time $T_{D\_Req}$ is not used. Instead, the EG Optimizing Time (EOT) that is a considerably longer than the CCUI is used. This EOT is set to be started when the EG control operation for channel adaptation begins or when the correlation values obtained through the EG control operation first belong to the target range. And, when this EOT time is over, the final EG is then determined. In this embodiment, the control unit 20 keeps recording the duration of each WEI, which the obtained correlation values are continuously maintained within the target range in, together with the EG applied just prior to that each WEI until the EOT is over. When the EOT ends, the control unit 20 finds the longest time from the duration information recorded up to then, and applies the recorded EG in association with the longest time to the analog equalizer 12 as the final EG.

On the other hand, in the embodiments of the present invention described with reference to the state diagram of FIG. 4, after determining and applying the final EG for the analog equalizer 12 in the channel adapting mode M02, the control unit 20 changes its mode to the idle mode M03. Thereafter, when power is supplied again to the receiver after power-off, the control unit 20 conducts the operation of finding and setting the final EG optimal for compensating the high-band loss caused in a communication channel, as described above. Unlike these embodiments, after determining and applying the final EG for the analog equalizer, the control unit 20 may enter a monitoring mode. Hereinafter, the operation of the control unit 20 which changed its mode to the monitoring mode according to another embodiment of the present invention will be described.

In the monitoring mode, the control unit 20 continues to check every CCUI the correlation values of the signal outputted from the analog equalizer 12 in the same manner as described above, even after the determination and application of the final EG. If the correlation values being checked in the monitoring mode in this way continuously deviate from the preset guard range for a pre-specified allowable time or more, for example, if they continuously deviate more than a limited number of times, the control unit 20 conducts the EG control operation that has been temporarily stopped. In order to conduct the EG control operation again, the control unit 20 reenters the channel adapting mode M02 from the monitoring mode, and resets the final EG for the analog equalizer according to any one of the above-described embodiments. By means of the operation in the monitoring mode as described above, even when the characteristics of a communication channel are changed from the first, the EG can be optimally set again in response to the changed loss characteristics.

The guard range may have the same width as the aforementioned target range. Alternatively, the guard range may be set to be slightly wider than the target zone.

Figure 9:
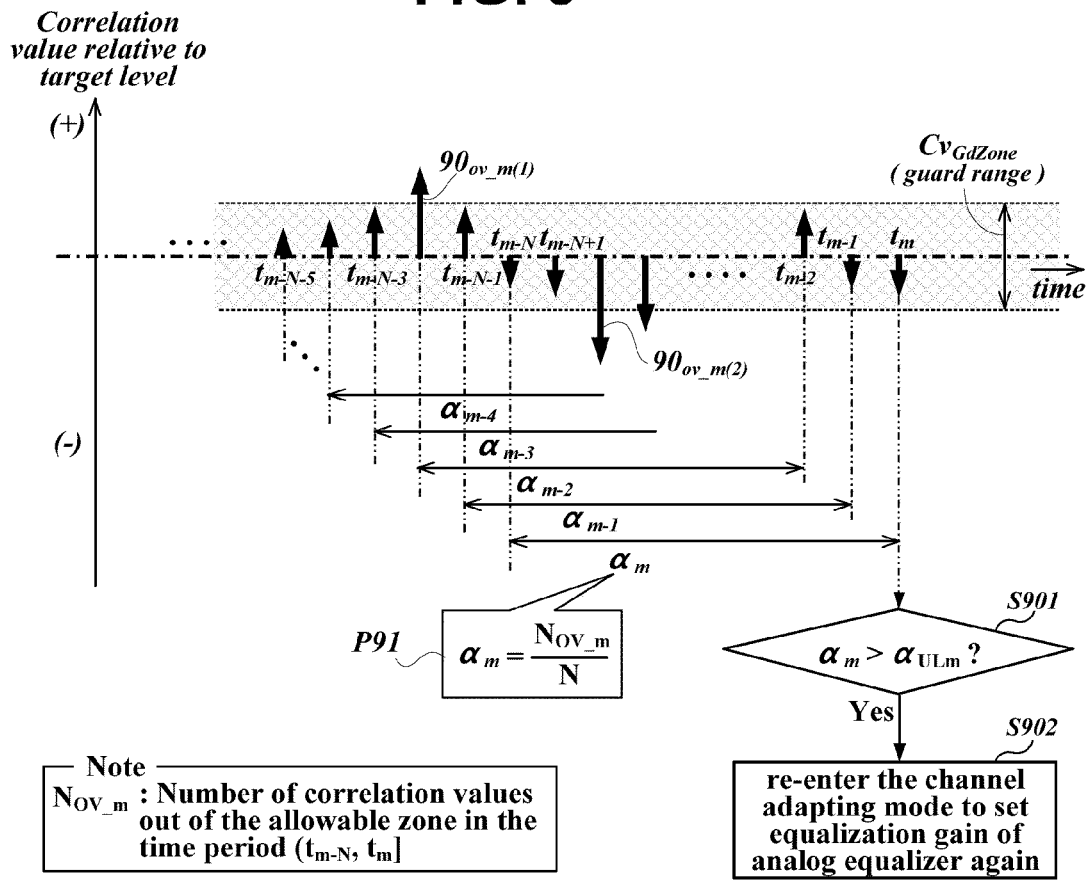
FIG. 9 schematically illustrates a method of determining and applying a gain for the ALE, and then checking whether the applied gain needs to be readjusted and selectively performing readjustment according to an embodiment of the present invention.

In another embodiment according to the present invention, with respect to the condition for reentering the channel adapting mode M02, another condition may be applied instead of the aforementioned condition that the correlation values are consecutively out of the guard range more than a predetermined number of times. FIG. 9 schematically illustrates a method of calculating a deviation ratio of correlation values and determining whether to reenter the channel adapting mode depending on the deviation ratio according to the present embodiment.

The deviation ratio $\alpha_i$(i= . . . m−1, m) in this embodiment is, as illustrated in FIG. 9, a ratio of the number $Nov_{-m}$ of correlation values $90_{ov\_m(i)}$, (i=1, 2, . . . ) out of the guard range $Cv_{GdZone}$ during a time period immediately before the current point of time to the total number N of correlation values taken consecutively for that time period (P91).

Whenever one correlation value is obtained, the control unit 20 calculates the deviation ratio, and then compares the deviation ratio with a preset upper limit ratio $\alpha_{ULm}$ (S901). In the comparison, if it is confirmed that the deviation ratio is greater than the upper limit ratio, the control unit 20 reenters the channel adapting mode M02 in order to set the most appropriate EG to the analog equalizer again (S902).

In the above-described embodiment, it is determined whether or not to reenter the channel adapting mode depending on the deviation ratio, but a different ratio, for example, a stability ratio (=1-deviation ratio), which is conceptually contrary to the deviation ratio, can be also used. Of course, in this case, when the calculated stability ratio becomes less than a preset lower limit ratio, the mode is changed back to the adapting mode and a suitable EG is determined again to be set to the analog equalizer.

In the embodiments explained so far, after determining and applying the final EG to be set to the analog equalizer 12 based on the correlation values checked during a predetermined time in order to properly compensate for signal loss in the high-band caused in a communication channel, the EG is set again only in the case that the correlation values show an equalization state that has deteriorated below a predetermined criterion, or the set EG is not readjusted until power is supplied again in the idle mode.

However, the principle and technical idea of the present invention do not presume that the EG of an analog equalizer should be finally determined and applied at arbitrary point in time. In other words, the present invention does not exclude an embodiment in which the adjusting the EG based on the correlation values of the signal outputted from an analog equalizer continues, without determining the final EG for the analog equalizer, while the receiver is operating. For example, in the case that the characteristics of a transmission channel between a transmitter and a receiver are severely changed, a particular embodiment in which the EG control operation is not terminated on the basis of time or condition can be applied according to the principles and technical ideas of the present invention explained in detail with the above embodiments. In this particular embodiment, the operation of adjusting the EG based on the correlation values is performed infinitely, at least while a received signal is inputted to the analog equalizer 12.

In addition, the principle and technical idea of the present invention are not limited only to the correlation, which is used as a basis for adjusting the EG of an analog equalizer, derived with a signal delayed by one UI as in the above-described embodiments. Accordingly, in the present invention, a signal delayed by ND (ND is an arbitrary integer greater than one) times of the UI can be applied to the correlation calculation for a received signal. And, based on the thus calculated correlation, the EG of an analog equalizer can be also adjusted in the same manner as in the above-described embodiments.

Figure 10:
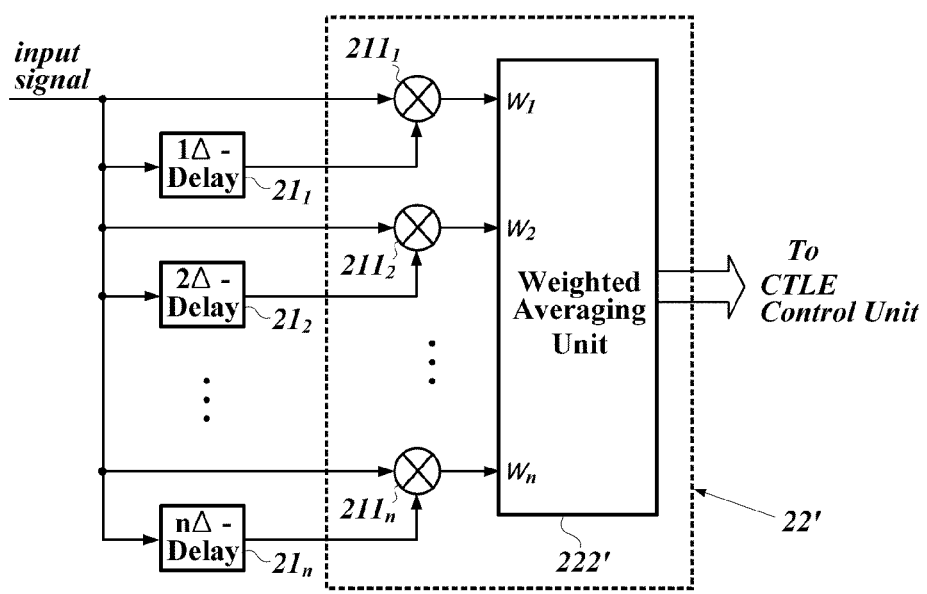
FIG. 10 illustrates a partial configuration of an ALE controller using a plurality of delayed signals in order to find the correlation with respect to a received signal according to an embodiment of the present invention.

In addition, a plurality of delayed signals may be used in computing the correlation for an input signal. FIG. 10 illustrates some elements of an AECU for such an embodiment. In the configuration of FIG. 10, a multi-delay unit $21_i$ (i=1, 2, . . . ), a multi-multiplication unit $211_i$ (i=1, 2, . . . ), and a weighted averaging unit 222' calculates a correlation value for an input signal from a plurality of differently delayed signals.

Each element of the multi-delay unit $21_i$ delays and outputs an input signal by a delay time k$\Delta$ (k=1, 2, . . . , $\Delta$ means UI) different from the time delayed by other elements. Each element of the multi-multiplication units $211_i$ multiplies the delayed signal with the original input signal, and then outputs the multiplied signal. The weighted averaging unit 222', as calculating a moving average for each multiplied signal, multiplies the moving average by a weight $w_i$(i=1, 2, . . . ) previously assigned for each delay, and then sums all the multiplied averages to produce a weighted moving average. With respect to the weighted moving average produced from the weighted averaging unit 222' as described above, the control unit 20 takes it every CCUI and uses the taken value as a correlation value that is a basis signal for controlling the EG as described above.

Instead of applying a weight to the moving average of each multiplied signal, the weighted averaging unit 222' may obtain a moving average of a signal made from summing the multiplied signals, each of which is multiplied by an assigned weight, and then provide it to the control unit 20.

The weight $w_i$ to be used in association with each delay signal by the weighted averaging unit 222' may be set by the control unit 20. Preferably, the shorter the delay time of an associated signal is, the larger the weight is assigned to be set in the weighted averaging unit 222'. Of course, the largest weight may be assigned to a delayed signal other than the signal having the shortest delay time, depending on the channel characteristics of a given communication environment.

In general, an analog equalizer used to compensate a high frequency components of a high-speed signal provides one signal input terminal so as to control its own EG for compensating high band of a signal. If an analog equalizer having input terminals to which control signals for individually controlling the gain for each band, subdivided from the high-band of a high-speed signal to be compensated, can be respectively inputted is provided, the AECU equipped with the configuration shown in FIG. 10 according to the present invention is also capable of controlling the gain for each band by inputting a plurality of EG control signals to such type of analog equalizer. In this embodiment, the weighted averaging unit 222' generates two or more moving average signals from a plurality of delayed signals and provides them to the control unit 20 to be respectively used as two or more correlation values.

As a more specific example, if two signal terminals (or a single signal terminal capable of receiving two values separately) to which a control signal for compensating high-frequency band can be applied are prepared in an analog equalizer, the weighted averaging unit 222' provides both a first weighted moving average signal and a second weighted moving average signal to the control unit 20. The first weighted moving average signal is what obtained by a method in which the higher the temporal correlation of a delayed signal is, that is, the shorter the delay time of a delayed signal is, the greater the weight to be applied thereto is, and the second weighted moving average is what another method in which the higher the temporal correlation of a delayed signal is, the smaller the weight to be applied is. Receiving the both weighted average signals, the control unit 20 applies appropriate control signals to the two signal terminals respectively based on them, or an integrated control signal, which designates a gain for each band, to a single signal terminal.

In the preceding explanation, when a smaller weight is applied, the smaller weight may be zero. This means that for a delayed signal to which the weight, namely zero is assigned, a multiplied signal by that delayed signal is not reflected in obtaining the moving average. For example, assuming that two weighted moving average signals are produced from four multiplied signals obtained individually from four signals delayed differently, as illustrated in FIG. 11, the weights for the two delayed signals are assigned to zero (110a, 110b), in the generation of each weighted moving average signal, so that the corresponding delay signals are not reflected in the correlation to be used as the basis for EG control.

Figure 11:
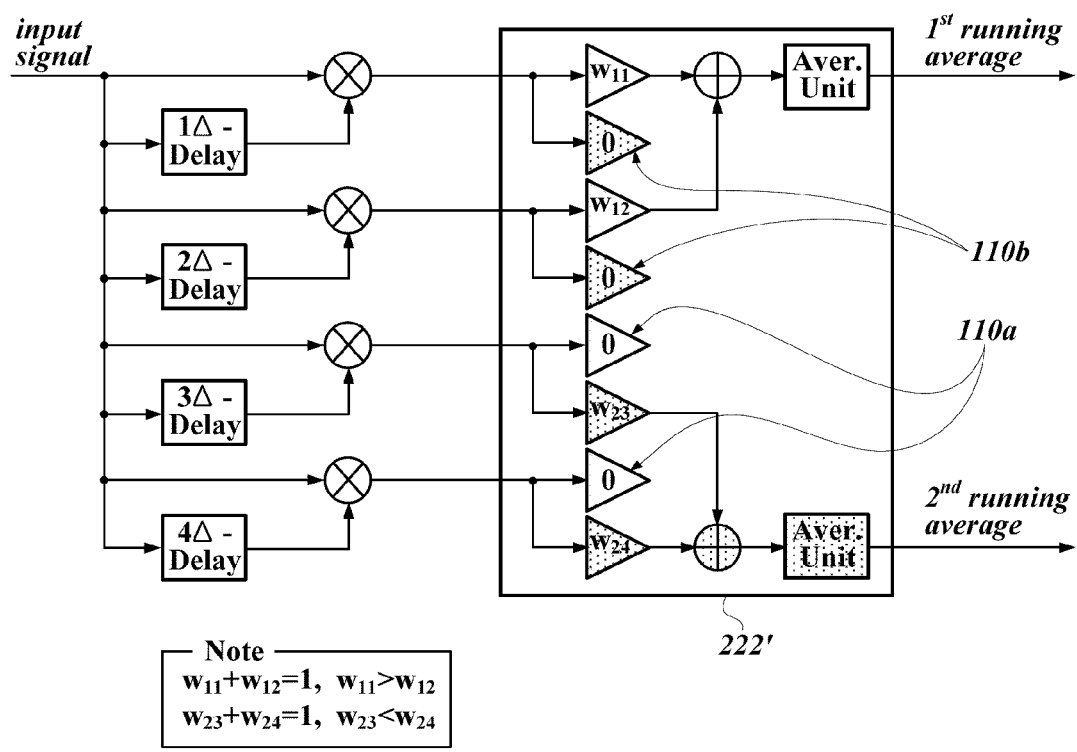
FIG. 11 is a diagram illustrating an example of a method of obtaining a plurality of correlation values for a received signal in the embodiment of FIG. 10.

Assigning zero to a weight is the same as dividing the delay signals for obtaining a correlation value into groups as illustrated in FIG. 11. In the case of applying the delay signals by dividing them into several groups in this way in obtaining an arbitrary weighted moving average signal, weights may be assigned to the delayed signals of each group in such a manner that a greater weight is given as the delay time is shorter. That is, in the example of FIG. 11, the weight $w_{23}$ may be equal to or larger than the weight $w_{24}$.

Unless the various embodiments, for the methods of compensating for loss of a high-speed signal in a communication channel, described so far are incompatible with each other, the explained embodiments can be properly chosen in various ways and then combined to embody the concept and idea of the present invention.

The embodiments of the present invention described above have been introduced for the purpose of illustration; therefore, it should be understood by those skilled in the art that modification, change, substitution, or addition to the embodiments is possible without departing from the technical principles and scope of the present invention defined by the appended claims.

What is claimed is:

1. A device for receiving a signal transmitted through a communication channel and recovering data from the signal, comprising:
    an equalizer configured to amplify a specific band of a signal received through the communication channel by a gain to be set by an inputted Gain Control Signal (GCS) and to output the amplified signal;
    a delay unit configured to delay the signal outputted from the equalizer by a predetermined first time interval;
    a correlator configured to multiply the signal outputted from the equalizer and the signal outputted from the delay unit, and to output a specific signal reflecting a temporal sum of a first signal that is produced by the multiplying; and
    a control unit configured to determine the GCS in a manner such that a difference between the specific signal and a predetermined target level is reduced, and to provide the determined GCS to the equalizer so as to be applied to the amplifying thereof,
    wherein the first time interval corresponds to N (N is an integer equal to or greater than one) times a unit interval that is occupied by one symbol in the signal received through the communication channel.

2. The device of claim 1, wherein the control unit is further configured to stop, at least temporarily, an adapting operation of determining the GCS depending on the specific signal and providing the determined GCS to the equalizer, after confirming an inverse section that the specific signal changes from a value lower than the target level to a value higher than the target level or vice versa.

3. The device of claim 2, wherein the control unit is further configured to stop the adapting operation at least temporarily, after confirming the inverse section more than a predetermined number of times.

4. The device of claim 2, wherein the control unit is further configured to conduct the adapting operation again if a state that the specific signal is out of a preset range continues for a predetermined allowable time or longer.

5. The device of claim 2, wherein the control unit is further configured to conduct the adapting operation again if a ratio of the specific signal deviating from a predetermined allowable range during a certain period of time prior to a present time is greater than a preset limit ratio.

6. The device of claim 1, wherein the control unit is further configured to stop, at least temporarily, an adapting operation of determining the GCS depending on the specific signal and providing the determined GCS to the equalizer, if a condition that the specific signal is maintained within a preset target range for longer than a predetermined reference time or that the specific signal is maintained for longer than the reference time without deviating from the target range for longer than an allowed time is satisfied.

7. The device of claim 6, wherein if the condition is not satisfied until a specified time limit has elapsed, the control unit stops the adapting operation at least temporarily, after causing a particular GCS to be applied to the amplifying of the equalizer, the particular GCS being a GCS provided to the equalizer just before start of an interval that the specific signal is kept longest within the target range during the time limit.

8. The device of claim 6, wherein the control unit is further configured to conduct the adapting operation again if a state that the specific signal is out of a preset range continues for a predetermined allowable time or longer.

9. The device of claim 6, wherein the control unit is further configured to conduct the adapting operation again if a ratio of the specific signal deviating from a predetermined allowable range during a certain period of time prior to a present time is greater than a preset limit ratio.

10. The device of claim 1, wherein the control unit is further configured:
    to measure duration of a particular interval that the specific signal is maintained within a predetermined target range whenever the particular interval occurs until a predetermined adapting time elapses;
    to cause a particular GCS to be applied to the amplifying of the equalizer when the adapting time has elapsed, the particular GCS being a GCS provided to the equalizer just before start of one duration that is longest among the measured durations; and
    to stop, at least temporarily after the causing the particular GCS to be applied, an adaptive operation of determining a GCS depending on the specific signal and providing the determined GCS to the equalizer.

11. The device of claim 10, wherein the control unit is further configured to conduct the adapting operation again if a state that the specific signal is out of a preset range continues for a predetermined allowable time or longer.

12. The device of claim 10, wherein the control unit is further configured to conduct the adapting operation again if a ratio of the specific signal deviating from a predetermined allowable range during a certain period of time prior to a present time is greater than a preset limit ratio.

13. The device of claim 1, wherein the control unit is further configured to conduct an adapting operation of determining the GCS depending on the specific signal and providing the determined GCS to the equalizer, at least during the received signal is inputted to the equalizer.

14. The device of claim 1, further comprising at least one second delay unit, each being configured to delay the signal outputted from the equalizer by a certain time interval different from that of other delay unit,
    wherein the correlator is further configured:
        to produce a second signal, for each of signals delayed and outputted by the at least one second delay unit, by multiplying a corresponding signal and the signal outputted from the equalizer; and
        to weighted-average a temporal sum of the at least one second signal and the temporal sum of the first signal with weights assigned individually to the at least one second signal and the first signal, and output a signal obtained by the weighted-averaging as the specific signal, and
    wherein the certain time interval corresponds to K (K is an integer of one or more other than the integer N) times the unit interval.

15. The device of claim 14, wherein in the weighted-averaging, a weight of a largest value is assigned to a signal with a shortest delayed time among the first signal and the at least one second signal.

16. The device of claim 1, further comprising at least one second delay unit, each being configured to delay the signal outputted from the equalizer by a certain time interval different from that of other delay unit, wherein the correlator is further configured:

to produce a second signal, for each of signals delayed and outputted by the at least one second delay unit, by multiplying a corresponding signal and the signal outputted from the equalizer;

to divide all signals, which consist of the first signal and the at least one second signal, into a plurality of groups; and to weighted-average temporal sums of one or more corresponding signals, for each of the divided groups, to be outputted, and wherein the control unit is further configured to determine the GCS based on a plurality of signals produced individually by the weighted-averaging, wherein the specific signal is any one of the plurality of signals, and wherein the certain time interval corresponds to K (K is an integer of one or more other than the integer N) times the unit interval.

17. The device of claim 1, wherein the delay unit and the correlator are respectively configured to receive and process digitized signals sampled by an A/D converter equipped at a front end of a digital processing block that restores digital data transmitted by a transmitter by digitally processing the signal outputted from the equalizer.

18. A method for compensating for loss of a signal transmitted through a communication channel, comprising the steps of:

multiplying a first signal and a second signal obtained by delaying the first signal by a predetermined time interval, the first signal being outputted from an equalizer that amplifies a specific band of a signal received through a communication channel by a gain to be set by an inputted Gain Control Signal (GCS);

producing a specific signal reflecting a temporal sum of the multiplied signal; and determining the GCS in a manner such that a difference between the specific signal and a predetermined target level is reduced, and providing the determined GCS to the equalizer so as to be applied to the amplifying thereof, wherein the time interval corresponds to N (N is an integer equal to or greater than one) times a unit interval that is occupied by one symbol in the signal received through the communication channel.

* * * * *